B. M. MITCHELL.
BELT FASTENER.
APPLICATION FILED AUG. 12, 1918.

1,318,576.

Patented Oct. 14, 1919.

Benjamin Merwin Mitchell
INVENTOR

BY *Ottomans* his ATTORNEY

WITNESS

UNITED STATES PATENT OFFICE.

BENJAMIN MERWIN MITCHELL, OF NEW YORK, N. Y.

BELT-FASTENER.

1,318,576.

Specification of Letters Patent.   Patented Oct. 14, 1919.

Application filed August 12, 1918.   Serial No. 249,540.

*To all whom it may concern:*

Be it known that I, BENJAMIN MERWIN MITCHELL, a citizen of the United States of America, residing at New York city, in the county and State of New York, have invented certain new and useful Improvements in Belt-Fasteners, of which the following is a specification.

My invention relates to an improved belt fastener for uniting the adjacent ends of conveyer, power transmitting, and like belts; and comprises a novel form of fastener plate and a special form of rivet coöperable therewith.

The usual form of belt fastener at present in use consists of a perforated plate and rivets passing through the perforated plate and the belt, the heads of the rivets projecting beyond the plane of the plate. These projecting rivet heads are the source of considerable trouble, and damage to the belts, especially in the case of conveyer belts which run over idlers or pulleys. When the belt runs on the return idlers, bottom side of the belt up, the rivet heads strike against the return idlers cutting the latter, and the constant impact of the rivet heads against the idlers wears off these heads, causing the rivets to pull out and frequently resulting in the belt being torn from end to end.

With the foregoing in view, the principal object of my invention is to provide a belt fastener by means of which the ends of the belt are securely fastened together, and damage to the belt and idlers is obviated. I accomplish this object by providing the plate with countersunk openings or seats for the rivet heads, whereby such heads do not project appreciably beyond the surface of the plate.

Another object of the invention is to facilitate the removal of the rivets from the plate, when this is necessary or desirable, and I attain this object by milling, pressing, or otherwise forming in proximity to the countersunk seats for the rivet heads suitable recesses or depressions which permit of the ready application of an extractor to the rivet and the quick and easy withdrawal of the latter.

A final object of the invention is the provision of a rivet capable of being clenched against the substance of the belt, and so formed that the danger of the rivet pulling out even under very great strain is negligible.

The preferred embodiment of the invention is illustrated in the accompanying drawings in which—

Figure 1:
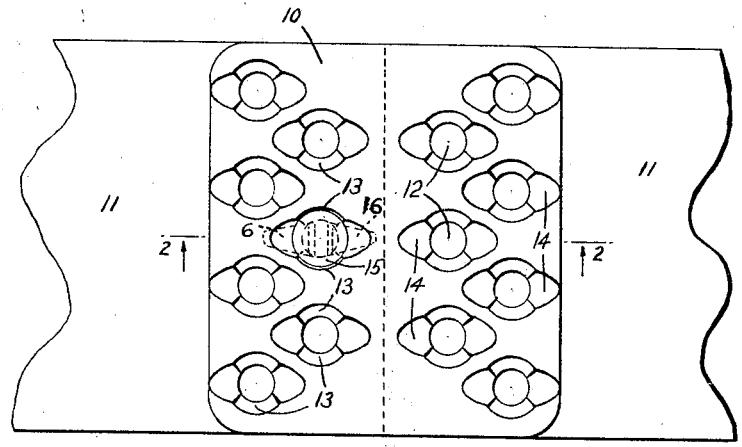
Figure 1 is a plan view of the plate, fragments of belt being shown.

The body of the fastener plate 10 is preferably slightly concavo-convex transversely, so as to conform to the curvature of the belt 11 as it passes over the idlers or pulleys. Formed at suitable intervals in the plate are any desired number of openings 12 through which the rivets are passed into the ends of the belt 11. About each opening 12, in the material of the plate 10, is a clearly defined countersunk portion 13 which serves as the seat for the rivet head in such manner that the latter does not appreciably project beyond the plane of the plate 10. The countersunk portions 13 about each opening 12 conform to the arc of a circle, the center of which is the center of such opening 12.

Adjacent each opening 12 and its countersunk seat 13 are oppositely disposed depressions or recesses 14, which are inclined from the upper toward the lower face of the plate 10. The recesses 14 may be formed in the plate in any suitable way, as by milling, pressing, or otherwise. The recesses 14 are relatively elongated, and interrupt the continuity of the corresponding countersunk seat 13 at two points of its circular periphery. In this manner the jaws of an extractor may be moved in these recesses to engage below the head of a rivet in a seat 13.

Figure 3:
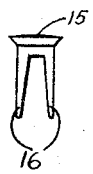
Fig. 3 is an elevational view of the special form of rivet which I employ.

In Fig. 3 I have shown the form of rivet which I prefer to employ with the plate described above. The rivet comprises a relatively flat head portion 15, and a bifurcated shank consisting of the fairly widely spaced legs 16.

Figure 2:
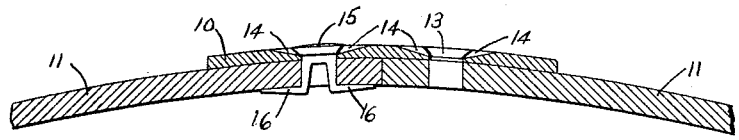
Fig. 2 is a transverse section on the line 2—2 of Fig. 1.

In practice, when the ends of a belt 11 are to be joined together by means of my improved fastener plate, such ends are juxtaposed, the plate 10 placed in position thereover and the rivets 15—16 forced through the openings 12 and through the belt until the head 15 of the rivet is seated in the countersunk portion 13, whereupon the legs 16 are splayed and clenched against the lower face of the belt as shown in Fig. 2. When the belt is to be shortened, which is at times required, and the ends thereof separated, a rivet extractor is employed to remove the rivets from one end only of the belt. Of course, if desired, the plate may be entirely removed from both ends of the belt but one advantage of my invention resides in the fact that a belt may be shortened by freeing one end thereof and permitting the plate to remain attached to the other end. In using the extractor, the jaws are alined with the recesses 14 and moved together to engage under the head 15 resting in the seat 13. Thus a firm grip on the rivet is secured, and the latter may be removed with comparatively little effort.

I have herein shown and described the preferred embodiment of my invention in considerable detail, and I desire it to be understood that the invention is not limited to the details so shown and described, but is capable of modification without departing from the spirit thereof as defined by the scope of the appended claims.

What I claim is:—

1. A belt fastener comprising a plate having a rivet opening therein, and a peripherally interrupted countersunk seat for a rivet head about such opening.

2. A belt fastener comprising a plate having a rivet opening therein, a countersunk seat for a rivet head about such opening, and oppositely disposed depressions merging in and extending to the base of said seat and interrupting its peripheral contour.

3. A belt fastener comprising a plate having a rivet opening therein, a countersunk seat for a rivet head about such opening, and oppositely disposed downwardly inclined depressions merging in and extending to the base of said seat and interrupting its peripheral contour.

4. A belt fastener, comprising a plate having a rivet opening therein, a countersunk seat for a rivet head about such opening, said seat comprising oppositely disposed beveled walls, and oppositely disposed depressions extending from the base of the seat between the walls thereof beyond the upper periphery of said seat, whereby the under face of a rivet head is accessible to a tool.

In testimony whereof I have affixed my signature in presence of two witnesses.

BENJAMIN MERWIN MITCHELL.

Witnesses:
A. F. GRANT,
JOS. B. VISCARD.